Nov. 10, 1931.  A. DINA  1,831,346
COMPOUND BASE FOR MOTION PICTURE PROJECTION MACHINES
Filed Nov. 30, 1928  4 Sheets-Sheet 1

Inventor
Augusto Dina
By his Attorney
Howard W. D+

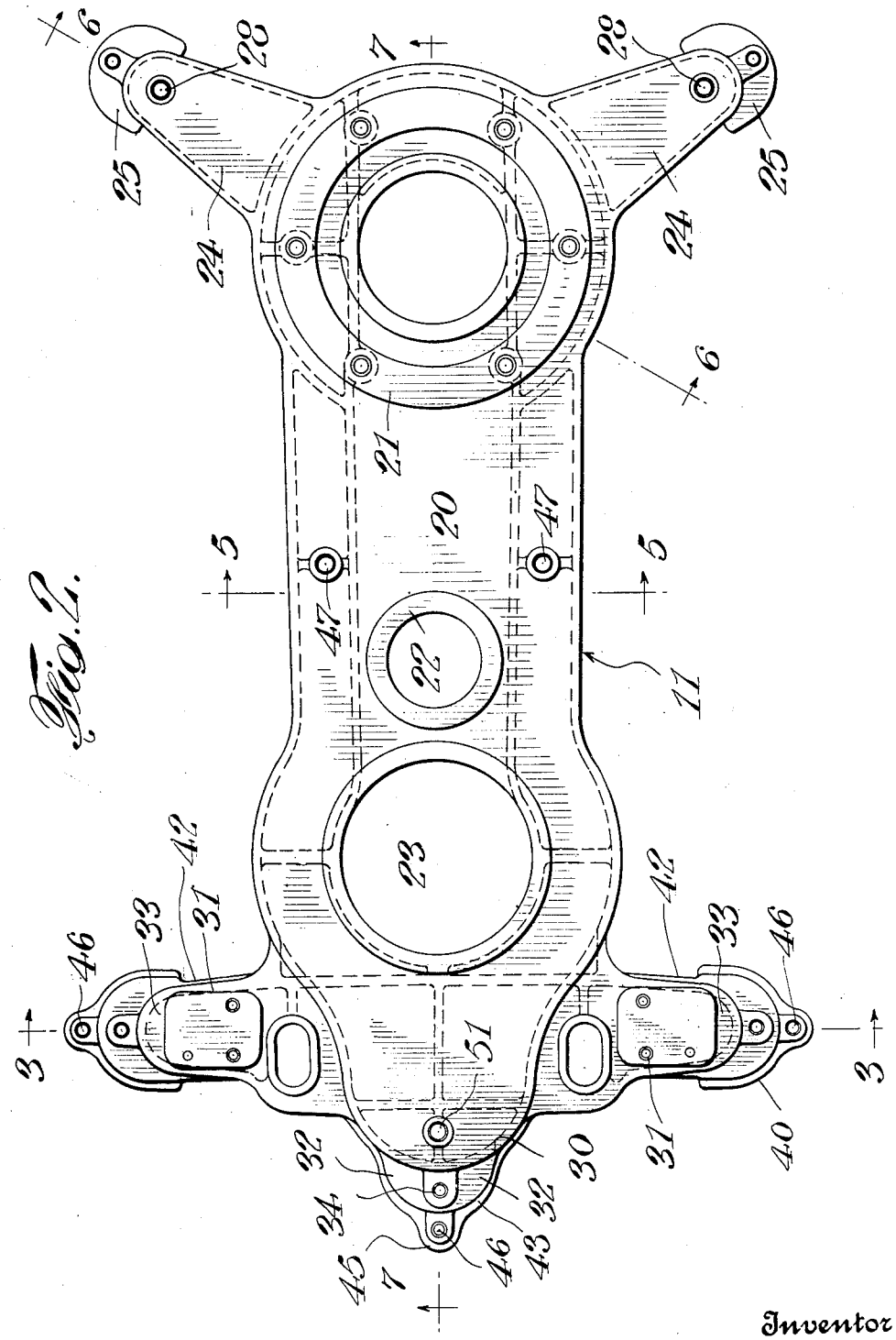

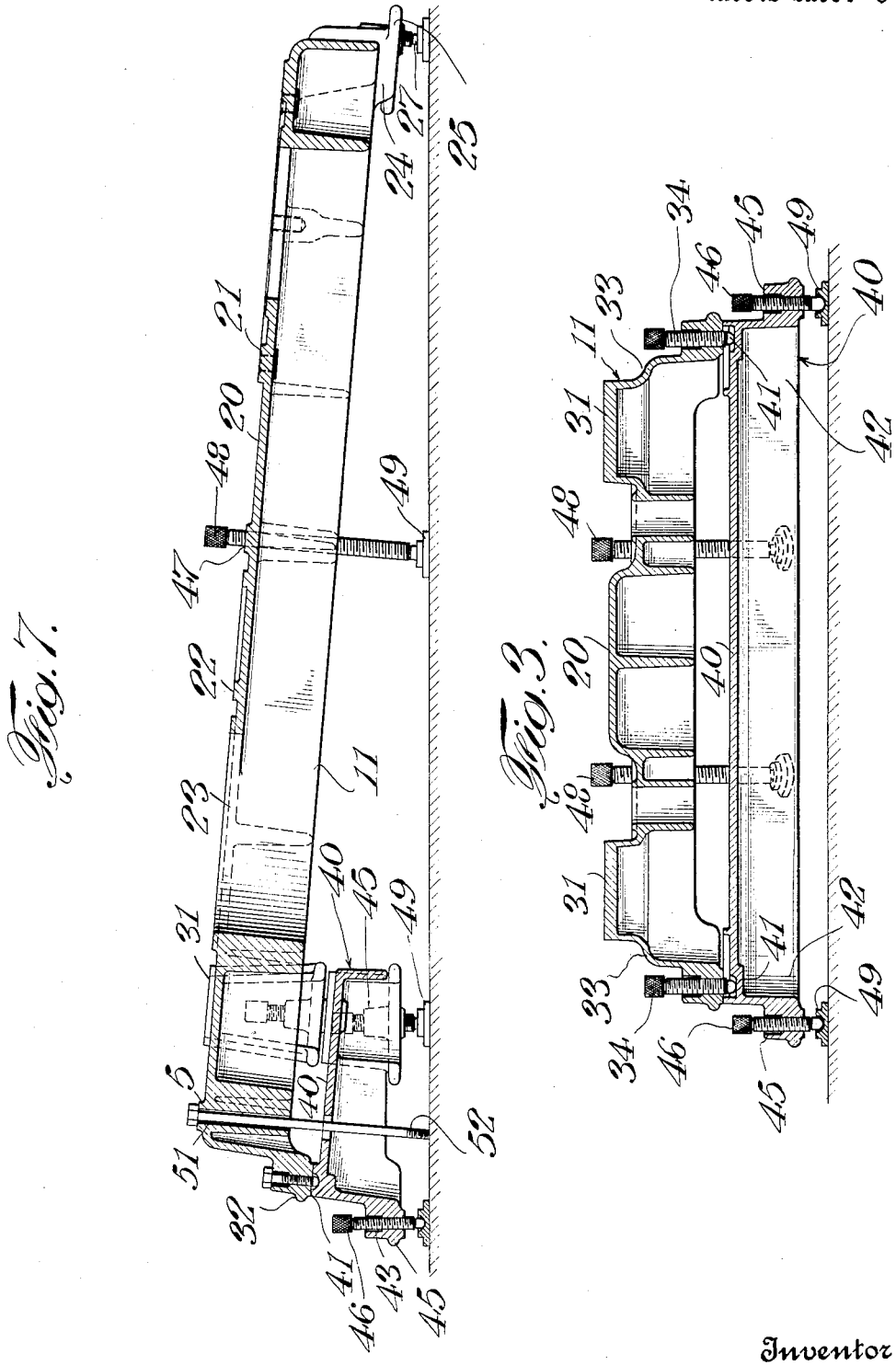

Nov. 10, 1931. A. DINA 1,831,346
COMPOUND BASE FOR MOTION PICTURE PROJECTION MACHINES
Filed Nov. 30, 1928 4 Sheets-Sheet 4
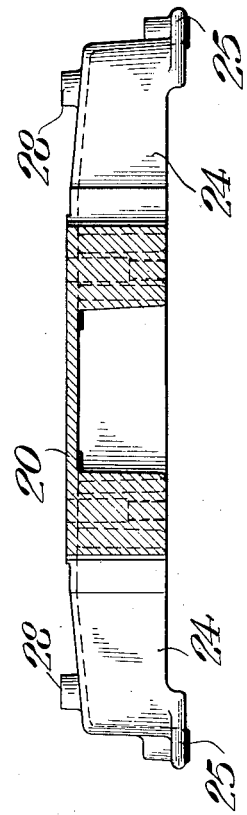
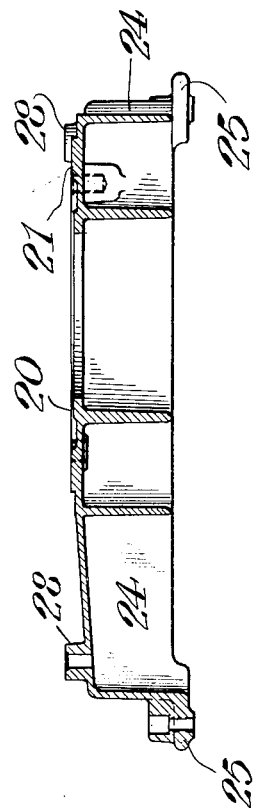
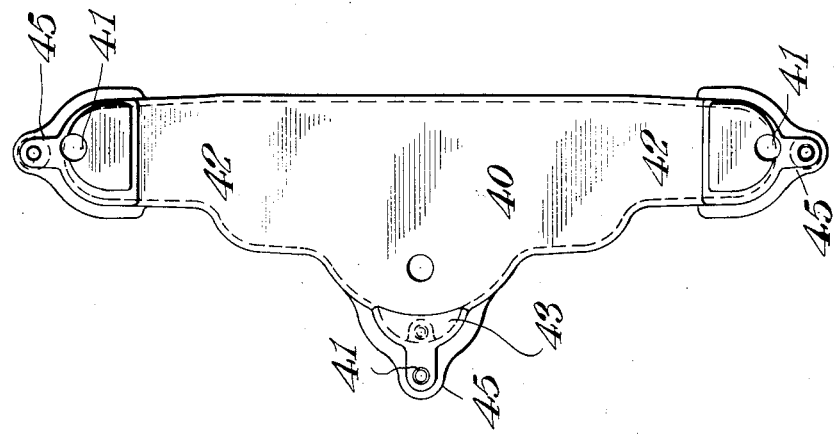
Inventor
Augusto Dina
By his Attorney
Howard W. Dix Patented Nov. 10, 1931

1,831,346

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

COMPOUND BASE FOR MOTION PICTURE PROJECTION MACHINES

Application filed November 30, 1928. Serial No. 322,697.

This invention relates to projection machines, and more particularly to a new and improved base therefor.

Projection machines are commonly so constructed as to permit the line of projection to be varied within certain limits for properly directing the picture upon a distant screen. It sometimes happens however, that due to the construction of a particular theatre, an unusually sharp angle of declination is necessary. This condition might occur, for example, in case the theatre were of unusual height or the horizontal distance between the projection machine and the screen were short compared to the elevation of the projection machine.

It is therefore an object of the present invention to provide adjustable means for permitting the line of projection to be varied beyond the normal angular deviation of the machine.

Another object is to provide a strong and rigid base which is capable of preventing undesired vibrations of the machine.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which, Fig. 1 is a side elevation of a projection machine showing the adjustable base;

Fig. 2 is a plan view of the base;

Fig. 3 is a section taken on the line 3—3 of Fig. 2 and looking in a direction parallel to the base;

Fig. 4 is a plan view of the adjustable support;

Fig. 5 is a section taken along the line 5—5 of Fig. 2;

Fig. 6 is a section taken along the line 6—6 of Fig. 2; and

Fig. 7 is a section taken along the line 7—7 of Fig. 2.

Like reference characters denote like parts in the several figures of the drawings.

Figure 1:
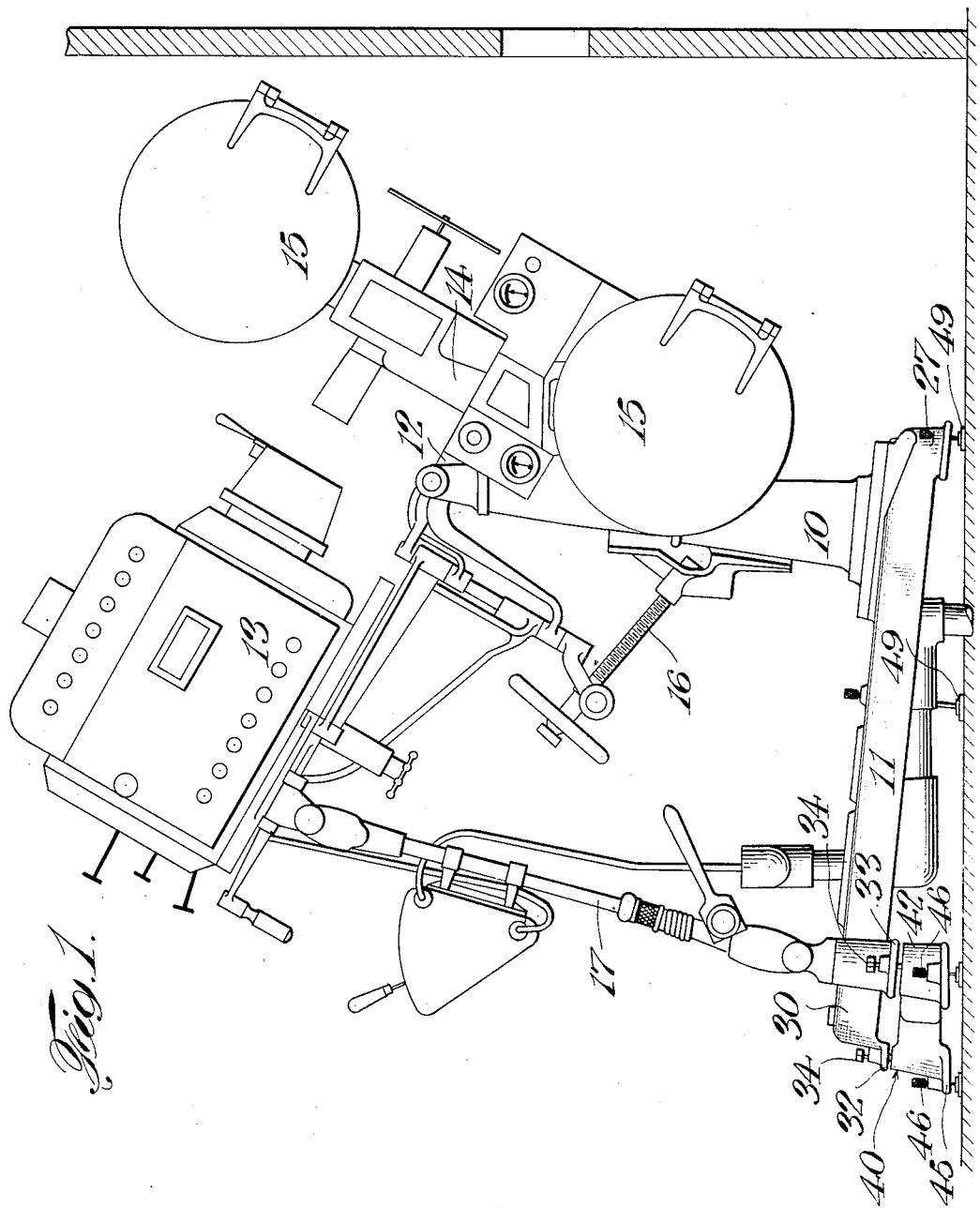

In the following description and in the claims parts will be identified by specific names for convenience, but they are intended to be as generic in their application to similar parts as the art will permit.

Referring to the drawings more in detail, the invention is shown as applied to a projection machine comprising a pedestal 10 mounted upon a base 11 which will be hereinafter described more in detail. Pedestal lever 12 is pivotally mounted on pedestal 10 and carries lamphouse 13, projection head 14 and film magazines 15. Adjusting screw 16 is provided for adjusting the angle of pedestal lever 12 with respect to pedestal 10 for varying the line of projection of the machine. Rear supporting legs 17 extend between pedestal lever 12 and base 11 and may be adjusted as to height by any desired means. The particular form of projection machine, however, forms no part of the present invention and will not be described in detail.

Base 11 comprises a body portion 20 having a flange 21 positioned for supporting pedestal 10, flange 22 for supporting a foot switch and an aperture 23 through which the electric cable may be applied to the machine. Base 11 is provided with a pair of forwardly extending legs 24 (Figs. 2 and 6) terminating in feet 25 in which bolts 27 may be threaded for purposes of adjustment. Said legs are also provided with a boss 28, having an aperture through which a bolt may be inserted for securing said leg to the supporting medium, such as the floor of the projection room.

Base 11 is also provided with a rearwardly extending leg 30 and sidewardly extending legs 31 which terminate in feet 32 and 33 respectively. Said feet are provided with suitable apertures in which adjusting bolts 34 may be threaded.

The adjustable base support comprises a member 40 (Fig. 4) which is provided with sidewardly extending legs 42 and a rearwardly extending leg 43 having a contour similar to that of the rear end of base 11 including legs 31 and 30 thereof under which they are positioned. Legs 42 and 43 terminate in feet 45 in which bolts 46 are threaded. Said legs are slightly longer than legs 31 and 30 and include cupped surfaces 41 which receive bolts 34 of base member 11.

The central portion of base member 11 is provided with threaded holes 47 (Fig. 2) in which bolts 48 are carried, said bolts being of sufficient length to contact with the supporting surface for assisting bolts 27 and 46 in carrying the weight of the base. Suitable cupped members 49 may be positioned under bolts 27 and 46, if desired, for distributing the stress over a larger portion of the supporting floor. The leg 30 of base 11 is preferably provided with a boss 51 having a suitable opening therein to permit the passage of bolt 52 which may be threaded into the supporting member or floor for securing the parts in their proper relationship.

When the line of projection of the projection machine cannot otherwise be adjusted to a sufficiently steep angle, the support is positioned under the rear end of the base and receives bolts 34 by means of which the base is carried. Bolts 27 and 46 are then adjusted in contact with the floor or supporting cups 49 to bring base 11 to its desired position. Said base may then be clamped to the floor by bolt 52 which is inserted through boss 51 at the rear end of said base and by suitable bolts (not shown) which may be inserted through bosses 28 on legs 24 of the base.

Support 40 is preferably constructed of slightly larger size than the rear end of base 11 in order to render bolts 46 readily accessible. Obviously a plurality of said supporting members could be employed if it were desired to project the picture at an excessively steep angle, the various feet of each member contact with suitable sockets in the adjacent member. By permitting the support to be adjusted with respect to the floor as well as with respect to the base itself a more flexible control is obtained.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In a projection machine comprising a base, pedestal and picture projection mechanism, said base being adapted to normally rest on a floor, means for increasing the angle of projection of said machine comprising a support, means for mounting the rear portion of said base on said support, and adjustable means for varying the elevation of said support with respect to the floor whereby the angle of projection of said machine may be varied.

2. In combination with a projection machine, a base having supporting feet, adjusting bolts extending through said feet, a support for certain of said feet, said support having dished surfaces in which said bolts are adapted to seat, a plurality of feet formed on said support, and adjusting bolts extending therethrough for determining the elevation of said support with respect to the floor.

3. In combination with a projection machine, a base having supporting feet, an adjustable support for certain of said feet, said support comprising a member having supporting surfaces adapted to engage said feet, and means for securing said support to said base comprising a bolt extended through said base and secured to a supporting member.

4. In combination with a projection machine, a base having front and rear feet, supporting bolts extending through said feet, an adjustable support for said rear feet, said support having surfaces adapted to contact with said supporting bolts and additional supporting bolts extending through said support and adapted to contact with a floor.

5. In combination with a base for a projection machine, a support therefor, adjusting bolts extending through said base and contacting with said support, and adjusting bolts extending through said support and contacting with the floor, said support being of greater extent than the adjacent portion of said base, said last mentioned bolts being positioned external to said base.

AUGUSTO DINA.